US008306808B2

(12) United States Patent
Elbaz et al.

(10) Patent No.: US 8,306,808 B2
(45) Date of Patent: Nov. 6, 2012

(54) METHODS AND SYSTEMS FOR SELECTING A LANGUAGE FOR TEXT SEGMENTATION

(75) Inventors: Gilad Israel Elbaz, Santa Monica, CA (US); Jacob L. Mandelson, Pasadena, CA (US)

(73) Assignee: Google Inc., Mountain View, CA (US)

(*) Notice: Subject to any disclaimer, the term of this patent is extended or adjusted under 35 U.S.C. 154(b) by 0 days.

(21) Appl. No.: 13/205,087

(22) Filed: Aug. 8, 2011

(65) Prior Publication Data
US 2011/0301939 A1 Dec. 8, 2011

Related U.S. Application Data

(63) Continuation of application No. 10/955,660, filed on Sep. 30, 2004, now Pat. No. 7,996,208.

(51) Int. Cl.
*G06F 17/20* (2006.01)
(52) U.S. Cl. .............................................. 704/8; 704/9
(58) Field of Classification Search ........... 704/8; 707/9
See application file for complete search history.

(56) References Cited

U.S. PATENT DOCUMENTS

| | | | |
|---|---|---|---|
| 4,839,853 A | 6/1989 | Deerwester et al. |
| 5,325,298 A | 6/1994 | Gallant |
| 5,423,032 A | 6/1995 | Byrd et al. |
| 5,454,046 A | 9/1995 | Carman, II |
| 5,499,360 A | 3/1996 | Barbara et al. |
| 5,619,709 A | 4/1997 | Caid et al. |
| 5,778,363 A | 7/1998 | Light |
| 5,778,364 A | 7/1998 | Nelson |
| 5,845,278 A | 12/1998 | Kirsch et al. |
| 5,890,103 A | 3/1999 | Carus |
| 5,933,822 A | 8/1999 | Braden-Harder et al. |
| 5,966,686 A | 10/1999 | Heidorn et al. |
| 6,002,998 A * | 12/1999 | Martino et al. ................. 704/9 |
| 6,006,222 A | 12/1999 | Culliss |
| 6,014,665 A | 1/2000 | Cullis |
| 6,044,375 A | 3/2000 | Shmueli et al. |
| 6,067,552 A | 5/2000 | Yu |
| 6,076,051 A | 6/2000 | Messerly et al. |
| 6,078,916 A | 6/2000 | Culliss |
| 6,119,164 A | 9/2000 | Basche |

(Continued)

FOREIGN PATENT DOCUMENTS

EP 0621542 B1 10/1994

(Continued)

OTHER PUBLICATIONS

U.S. Appl. No. 10/726,483.

(Continued)

*Primary Examiner* — Jakieda Jackson
(74) *Attorney, Agent, or Firm* — Fish & Richardson P.C.

(57) ABSTRACT

Methods and systems for selecting a language for text segmentation are disclosed. In one embodiment, at least a first candidate language and a second candidate language associated with a string of characters are identified, at least a first segmented result associated with the first candidate language and a second segmented result associated with the second candidate language are determined, a first frequency of occurrence for the first segmented result and a second frequency of occurrence for the second segmented result are determined, and an operable language is identified from the first candidate language and the second candidate language based at least in part on the first frequency of occurrence and the second frequency of occurrence.

18 Claims, 2 Drawing Sheets

U.S. PATENT DOCUMENTS

| | | | |
|---|---|---|---|
| 6,134,532 A | 10/2000 | Lazarus et al. | |
| 6,178,419 B1 | 1/2001 | Legh-Smith | |
| 6,182,068 B1 | 1/2001 | Culliss | |
| 6,185,559 B1 | 2/2001 | Brin et al. | |
| 6,230,168 B1 | 5/2001 | Unger et al. | |
| 6,233,575 B1 | 5/2001 | Agrawal et al. | |
| 6,269,189 B1 | 7/2001 | Chanod | |
| 6,269,361 B1 | 7/2001 | Davis et al. | |
| 6,272,456 B1 | 8/2001 | de Campos | |
| 6,285,999 B1 | 9/2001 | Page | |
| 6,289,304 B1* | 9/2001 | Grefenstette | 704/9 |
| 6,289,342 B1 | 9/2001 | Lawrence | |
| 6,289,353 B1 | 9/2001 | Hazelhurst et al. | |
| 6,298,348 B1 | 10/2001 | Eldering | |
| 6,314,419 B1 | 11/2001 | Faisal | |
| 6,324,519 B1 | 11/2001 | Eldering | |
| 6,334,131 B2 | 12/2001 | Chakrabarati et al. | |
| 6,421,675 B1 | 7/2002 | Ryan et al. | |
| 6,453,315 B1 | 9/2002 | Weissman et al. | |
| 6,493,702 B1 | 12/2002 | Adar et al. | |
| 6,526,440 B1 | 2/2003 | Bharat | |
| 6,529,903 B2 | 3/2003 | Smith et al. | |
| 6,542,401 B2 | 4/2003 | Yamauchi et al. | |
| 6,615,209 B1 | 9/2003 | Gomes et al. | |
| 6,640,006 B2 | 10/2003 | Wu et al. | |
| 6,658,423 B1 | 12/2003 | Pugh et al. | |
| 6,678,409 B1 | 1/2004 | Wu et al. | |
| 6,678,681 B1 | 1/2004 | Brin | |
| 6,704,698 B1* | 3/2004 | Paulsen et al. | 704/1 |
| 6,714,939 B2 | 3/2004 | Saldanha et al. | |
| 6,725,259 B1 | 4/2004 | Baharat | |
| 6,738,764 B2 | 5/2004 | Mao et al. | |
| 6,754,873 B1 | 6/2004 | Law et al. | |
| 6,766,320 B1 | 7/2004 | Wang et al. | |
| 6,810,375 B1 | 10/2004 | Ejerhed | |
| 6,816,857 B1 | 11/2004 | Weissman et al. | |
| 6,826,559 B1 | 11/2004 | Ponte | |
| 6,910,003 B1 | 6/2005 | Arnold et al. | |
| 6,968,308 B1 | 11/2005 | Brockett et al. | |
| 7,107,218 B1 | 9/2006 | Preston | |
| 7,174,290 B2* | 2/2007 | Loofbourrow et al. | 704/9 |
| 7,409,334 B1 | 8/2008 | Shoemaker | |
| 7,698,341 B2 | 4/2010 | Rubendall | |
| 7,747,633 B2 | 6/2010 | Kadiyska et al. | |
| 7,761,458 B1 | 7/2010 | Eshghi et al. | |
| 7,792,814 B2 | 9/2010 | Cohen | |
| 2002/0002450 A1 | 1/2002 | Nunberg et al. | |
| 2002/0002452 A1 | 1/2002 | Christy et al. | |
| 2002/0042791 A1 | 4/2002 | Smith et al. | |
| 2002/0059221 A1 | 5/2002 | Whitehead et al. | |
| 2002/0099700 A1 | 7/2002 | Li | |
| 2002/0107683 A1 | 8/2002 | Eisele | |
| 2002/0123988 A1 | 9/2002 | Dean et al. | |
| 2002/0133481 A1 | 9/2002 | Smith et al. | |
| 2002/0165849 A1 | 11/2002 | Singh et al. | |
| 2003/0126235 A1 | 7/2003 | Chandrasekar et al. | |
| 2004/0059708 A1 | 3/2004 | Dean et al. | |
| 2004/0098247 A1* | 5/2004 | Moore | 704/4 |
| 2004/0119740 A1 | 6/2004 | Chang et al. | |
| 2004/0122656 A1* | 6/2004 | Abir | 704/4 |
| 2004/0122811 A1 | 6/2004 | Page | |
| 2004/0138869 A1* | 7/2004 | Heinecke | 704/1 |
| 2005/0086065 A1 | 4/2005 | Maion et al. | |
| 2005/0086205 A1 | 4/2005 | Franciosa et al. | |
| 2005/0131872 A1 | 6/2005 | Calbucci et al. | |
| 2005/0154578 A1 | 7/2005 | Tong et al. | |
| 2005/0228797 A1 | 10/2005 | Koningstein et al. | |
| 2005/0289473 A1 | 12/2005 | Rousso et al. | |
| 2007/0118356 A1 | 5/2007 | Badino | |
| 2008/0059607 A1 | 3/2008 | Schneider | |

FOREIGN PATENT DOCUMENTS

| | | |
|---|---|---|
| EP | 0 672 988 | 9/1995 |
| EP | 1 014 276 | 6/2000 |
| JP | H10-124513 | 5/1998 |
| JP | 2000-194696 | 7/2000 |
| JP | 2001-101186 | 4/2001 |
| JP | 2002-245470 | 8/2002 |
| JP | 2003-186789 | 7/2003 |
| WO | WO97/07656 | 3/1997 |
| WO | WO 00/79436 | 12/2000 |
| WO | WO02/095614 | 11/2002 |

OTHER PUBLICATIONS

U.S. Appl. No. 09/493,701, filed Jan. 28, 2000, Weissman et al.

U.S. Appl. No. 60/507,617.

A9.com>Company>What's New & Cool web page at http://a9.com/-/company/whatsCool.jsp, as available via the Internet and printed on Jul. 29, 2004.

An Annotea Bookmark Schema web page at http://www.w3.org/2003/07/Annotea/BookmarkSchema-200300707, as available via the Internet and printed on Sep. 28, 2003.

Annotea: An Open RDF Infrastructure for Shared Web Annotations web page at http://www.w3.org/2001/Annotea/Papers/www10/annotea-www10html , as available via the Internet and printed on Sep. 28, 2003.

Applied Semantics News Series, pp. 1-4, brochure, no date.

Applied Semantics, Applied Semantics Launches Contextual Targeting Pay-For-Performance Ad Service Solution, Applied Semantics—Press Release, Oct. 21, 2002, pp. 1-2, web page at http://www.appliedsemantics.com/ne/ne_pr_081302.html as available via the Internet and printed on Aug. 18, 2003.

Applied Semantics, Inc.—Press Release, Applied Semantics Launches News Series to Power Publishing, page at http://www.appliedsemantics.com/ne/ne_pr_102102.html as available via the Internet and printed on Aug. 18, 2003.

Barrett, R. et al., How to Personalize the Web, Proceedings of the ACM Conference on Human Factors in Computing Systems, 1997.

Barroso et al., Web Search for a Planet: The Google Cluster Architecture, IEEE Computer Society, 2003, pp. 22-28.

Bharat, K. SearchPad: Explicit Capture of Search Context to Support Web Search, web page at http://www9.org/w9cdrom/173/173.html as available via the Internet and printed on Sep. 28, 2003.

bk2site web page at http://bk2site.sourceforce.net/ as available via the Internet and printed on Sep. 28, 2003.

BlinkPro: Powerful Bookmark Manager: web page at http://www.blinkpro.com/, as available via the Internet and printed on Sep. 28, 2003.

Bookmark Tracker.com web page at http://www.bookmrktracker.com/, as available via the Internet and printed on Sep. 28, 2003.

Brin, S. et al., The Anatomy of a Large-Scale Hypertextual Web Search Engine,: 1998, Computer Science Department, Stanford University, Stanford, CA.

Chang, Chia-Hui et al., IEPAD: Information Extraction Based on Pattern Discovery, 2001, Dept. of Computer Science and Information Engineering, National Central University, Chung-Li, Taiwan.

Chi et al., Context Query in Information Retrieval, Proceedings of the 14th IEEE International Conference on Tools with Artificial Intelligence, IEEE Comp. Soc. vol. Conf. Nov. 14, 2002, pp. 101-106.

CIRCA Technology Overview, Applied Semantics White Paper, Jul. 2001, pp. 1-10.

Conerva—Products: Retrieval Ware, RetrievalWare—Optimized Search Precision & Recall web page at http://www.convera.com/products/nw_precisions.asp as available via the Internet and printed on Oct. 30, 2003.

Crescenzi, V., et al., RoadRunner: Towards Automatic Date Extraction from Large Web Sites, Proceedings of the 27th VLDB Conference, 2001, Rome, Italy.

Czyowicz, J. et al., Evaluation of Hotlinks Assignment Heuristics for Improving Web Access, Second Int'l Conference on Internet Computing (IC'01), vol. 2, Jun. 25-28, 2001, pp. 793-799, Las Vegas, Nevada, CSREA Press.

Delort, J. et al., Enhanced Web Document Summarization Using Hyperlinks, HYPO TUBE'03, Aug. 26-30, 2003, Nottingham, United Kingdom.

Denoue, L. et al., An annotation tool for Web browers and its application to information retrieval, Syscom University de Savoie, France.

Fellbaum, C. ed. WorldNet: An Electronic Lexical Database, Cambridge: The MIT Press, Mar. 1998, pp. 117-127, 285-303, P325. 5d38w67 1998.

Freitag, D., et al., Boosted Wrapper Induction, 2000, American Association for Artificial Intelligence.

FurlBeta What is Furl web page at http://www.furl.net/leranMore.jsp, as available via the Internet and printed on Jul. 29, 2004.

Geller, M. Quigo Signes Deal with Overture:, MediaDailyNews, Aug. 13, 2003 web page at http://www.mediapost.com/dtis_dsp_news.cfm?NewsID=215196 available via the Internet and printed on Sep. 21, 2004.

Google, News Results for Search Engines, web page at http://www.google.com/search?hl=en&i.e..=UTF-8&q=search+engines, as available via the Internet and printed on Jul. 26, 2004.

Grefenstette, Gregory, "Comparing Two Language Identification Schemes" International Conference on Statistical Analysis of Textual Data, Dec. 11, 1995.

Hsu, C. et al., Generating Finite-State Transducers for Semi-Structured Data Extraction from the Web, Information Systems, 1998, pp. 521-538, vol. 23, No. 8, Elsevier Science Ltd., Great Britain.

iKeepBookmarks.com—A web-Based Bookmark Manager web page at http://www.ikeepbookmarks.com/ as available via the Internet and printed on Sep. 28, 2003.

Kaasten, S. et al., Designing an Integrated Bookmark/History System for Web Browsing, History Keeping in Computer Applications: A workshop, held at Human-Computer Interaction Laboratory, University of Maryland, Maryland, Dec. 2, 1999.

Kaasten, S. et al., Designing an Integrated Bookmark/History System for Web Browsing, Proceedings of the Western Computer Graphics Symposium, Mar. 26-29, 2000.

Kaasten, S. et al., How People Recognize Previously Seen WWW Pages from Tiles, URLs and Thumbnails in X. Faulkner, J. Finlay, F. Detienne (Eds.) People and Computers XVI (Proceedings of Human Computer Interaction 2002) BCS Conference Series, 247-265, Spriger Verlag at web page http://www.cpse.ucalgary.ca/grouplab/papers/200202-ThumbnailStudy.BHCI/abstract.html, as available via the Internet and printed on Jul. 29, 2004.

Kaasten, S. et al., Integrating Back, History and Bookmarks in Web Browsers, In Extended Abstracts of the ACM Conference of Human Factors in Computing Systems (Chi'01), 2000.

Koll, M.B. Information Retrieval Theory and Design Based on a Model of the User's Concept Relations, Proceedings of the $3^{rd}$ Annual ACM Conference on Research and Development in Information Retrieval, 1980, pp. 77-93.

Kushmerick, N. et al., Adaptive information extraction: Core technologies for information agents,: 2002, Computer Sciences Debarment, University College Dublin.

Kushmerick, N. Wrapper induction: Efficiency and expressiveness,: Artificial Intelligence 2000, pp. 15-68, 118, Elsevier Science B.V.

Kushmerick, N., Finite-state approaches to Web information extraction, 2002, Computer Sciences Debarment, University College Dublin.

Laender, A. et al., A Brief Survey of Web Data Extraction Tools, 2002, Department of Computer Science, Federal University of Minas Gerais, Belo Horizonte MG Brazil.

Li, W., et al., PowerBookmarks: A System for Personalizable Web Information Organization, Sharing and Management, Sigmod Conference 1999, pp. 565-567.

Maarek, Y., et al., Automaticllly Organizing Bookmarks per contents, $5^{th}$ Int'l World Wide Web Conference, Paris, France, May 6-10, 1996 a web page http://www.5conf.inria.fr/fich_html/ppaers/P37/Overview.html, as available via the Internet and printed on Sep. 28, 2003.

Middleton, S. et al., Capturing Knowledge of User Preferences: Ontologies in Recommender System, Proceeding of the $1^{st}$ Int'l Conference on Knowledge Capture (K-CAP), Oct. 2001.

Muslea, I., et al., Hierarchical Wrapper Induction for Semistructured Information Sources, 1999, pp. 1-27, Kluwer Academic Publishers, the Netherlands.

Ontology Usage and Applications, Applied Semantics Technical White Paper, Jul. 2001, pp. 1-15.

Oztekin, U. et al., usage Meets Link Analysis: Towards Improving Site Specific and Intranet Search via Usage Statistics. Technical Report, Department of Computer Science and Engineering, University of Minnesota, May 24, 2004.

Powerful Revenue Solutions of Online Publishers, Applied Semantics AdSense, pp. 1-2, brochure, no date.

RSS 1.0 channel for bookmark sharing. from Dan Brickleyon on Jan. 29, 2001 web page at http://lists.w3.org/Archives/Public/www-annotatin/2001Jan.Jun/0002.html, as available via the Internet and printed on Sep. 28, 2003.

Save This Homepage Gourmet the Magazine for good Living web page at http://www.savethis.clickability.com/saveThisApp?clickMap=displayHelp&helpID=0 as available via the Internet and printed on Sep. 28, 2003.

Staab, S., et al., An Annotation Framework for the Semantic Web, Proceedings of the $1^{st}$ Int'l Workshop on Multimedia Annotation, Tokyo, Japan, Jan. 30-31, 2001.

Sullivan, D. AlmondNet Debuts Post-Search Behavioral Ad Network web page at http://searchenginwatch.com/searchday/article.php/3464811 as available via the Internet and printed on Feb. 10, 2005.

Tauscher L. et al., Revisitation Patterns in World Wide Web Navigations, ACM SIGCHI '97, Proceedings of the Conference on Human Factors in Computing Systems, held in Atlanta, George, Mar. 22-27, ACM Press.

Tengi, R.I. Design and Implementation of the WorldNet Lexical Database and Searching Software, in WorldNet: An electronic Lexical Data Base, Fellbaum, C. ed., Cambridge: The MIT Press 1998, 105-127.

Terveen, L. et al., A System for Sharing Recommendations, Communication of the ACM, vol. 40, No. 3, Mar. 1997.

TinyURL.com—where tiny is better: web page at http://tinuURL.com, as available via the Internet and printed on Nov. 11, 2003.

Shum, et al. Verity Introduces Customizable Industry and Enterprise Taxonomies, Verity, Nov. 17, 2003, pp. 1-2.

Voorhees, E.M., Query Expansion Using Lexical-Semantic Relations, Proceedings to the $17^{th}$ Annual ACM Conference on Research and Development in Information Retrieval, Aug. 1994, pp. 61-69.

Walker "Marking a New Tool for Surfers" [retrieved from the internet] http://www.washingtonpost.com/ac2/wp-dyn/A132-2000Sep13?languate=printer, [retrieved on Sep. 28, 2003].

White, M. et al., Multidocument Summarization via Information Extraction, First Int'l Conference on Human Language Technology Research (HLT) 2001.

Wang et al., "A Word Segmentation Method with Dynamic Adapting to Text Using Inductive Learning," Association for Computational Linguistics, 2002, pp. 1-5.

ZNAIL—for easier living in a virtual Internet and printed on Sep. 28, world web page at http://www.znail.com, as available via the Internet and printed on Sep. 28, 2003.

International Search Report & Written Opinion for Application No. PCT/US2005/035010, dated May 16, 2006, 15 pages.

Russian Office Action for Application No. 2006127425, mailed Jan. 29, 2008, 4 pages.

Japanese Non-final Office Action in Japanese Patent Application No. 2007-534758, mailed Sep. 13, 2011, 172 pages.

* cited by examiner

METHODS AND SYSTEMS FOR SELECTING A LANGUAGE FOR TEXT SEGMENTATION

CROSS-REFERENCE TO RELATED APPLICATIONS

This application is a continuation of and claims priority under 35 U.S.C. §120 to U.S. application Ser. No. 10/955,660, filed on Sep. 30, 2004, and entitled "Methods and Systems for Selecting a Language for Text Segmentation," the entire contents of which are hereby incorporated by reference.

FIELD OF THE INVENTION

The present invention relates generally to text segmentation and, more particularly, to selecting a language for text segmentation.

BACKGROUND OF THE INVENTION

Text processing methods and systems exist that attempt to interpret data representing text. Text processing is made more difficult when text comprising a string of characters is received that has no breaks indicating words or other tokens. When processing such strings of characters using existing methods and systems, the characters can be segmented into tokens in order to interpret the string. Tokens can be words, acronyms, abbreviations, proper names, geographical names, stock market ticker symbols, or other tokens. Generally, a string of characters may be segmented into multiple combinations of segmented strings of characters using existing methods and systems. Selecting the correct language to use when segmenting the text can produce more meaningful results.

SUMMARY

Embodiments of the present invention comprise methods and systems for selecting a language for text segmentation. One embodiment of the present invention comprises identifying at least a first candidate language and a second candidate language associated with a string of characters, determining at least a first segmented result associated with the first candidate language from the string of characters and a second segmented result associated with the second candidate language from the string of characters, determining a first frequency of occurrence for the first segmented result and a second frequency of occurrence for the second segmented result, and identifying an operable language from the first candidate language and the second candidate language based at least in part on the first frequency of occurrence and the second frequency of occurrence.

This exemplary embodiment is mentioned not to limit or define the invention, but to provide an example of an embodiment of the invention to aid understanding thereof. Exemplary embodiments are discussed in the Detailed Description, and further description of the invention is provided there. Advantages offered by the various embodiments of the present invention may be further understood by examining this specification.

BRIEF DESCRIPTION OF THE DRAWINGS

These and other features, aspects, and advantages of the present invention are better understood when the following Detailed Description is read with reference to the accompanying drawings, wherein.

DETAILED DESCRIPTION

Introduction

Embodiments of the present invention comprise methods and systems for selecting a language for text segmentation. There are multiple embodiments of the present invention. By way of introduction and example, one exemplary embodiment of the present invention provides a method for improving segmenting a string of characters, such as a domain name, into multiple tokens or words by selecting the correct language for the string of characters. A number of potential or candidate languages for the string of characters may be selected based on a variety of signals, such as linguistics associated with the string of characters, an IP address associated with the user, a character set used for the string of characters, browser settings of a browser application program associated with the user, and any top-level domain associated with the string of characters. The string of characters may be segmented into many segmented results using each candidate language. Each segmented result can be a particular combination of words or other tokens. For example, the string of characters "usedrugs" can be segmented into the following segmented results for the English language: "used rugs", "use drugs", "us ed rugs", etc. From this number of segmented results for each candidate language, an operable segmented result and an operable language can be identified based on the number of documents or search queries in the operable language that contain the operable segmented result.

For example, segmented results with the highest probability of being the best operable segmented result can be selected for each candidate language. A search engine can determine the number of documents or search queries containing a selected segmented result and can do this for each selected segmented result in each candidate language. In one embodiment, the segmented result that occurs with the greatest frequency in documents or search queries in the particular language may be identified as the best operable segmented result. The language associated with the best operable segmented result may be identified as the best operable language. Language signals used to determine the candidate languages can also be used to select the operable language. The operable segmented result and operable language can be used for a variety of functions, including selecting advertisements based on the language and result.

This introduction is given to introduce the reader to the general subject matter of the application. By no means is the invention limited to such subject matter. Exemplary embodiments are described below.

System Architecture

Figure 1:
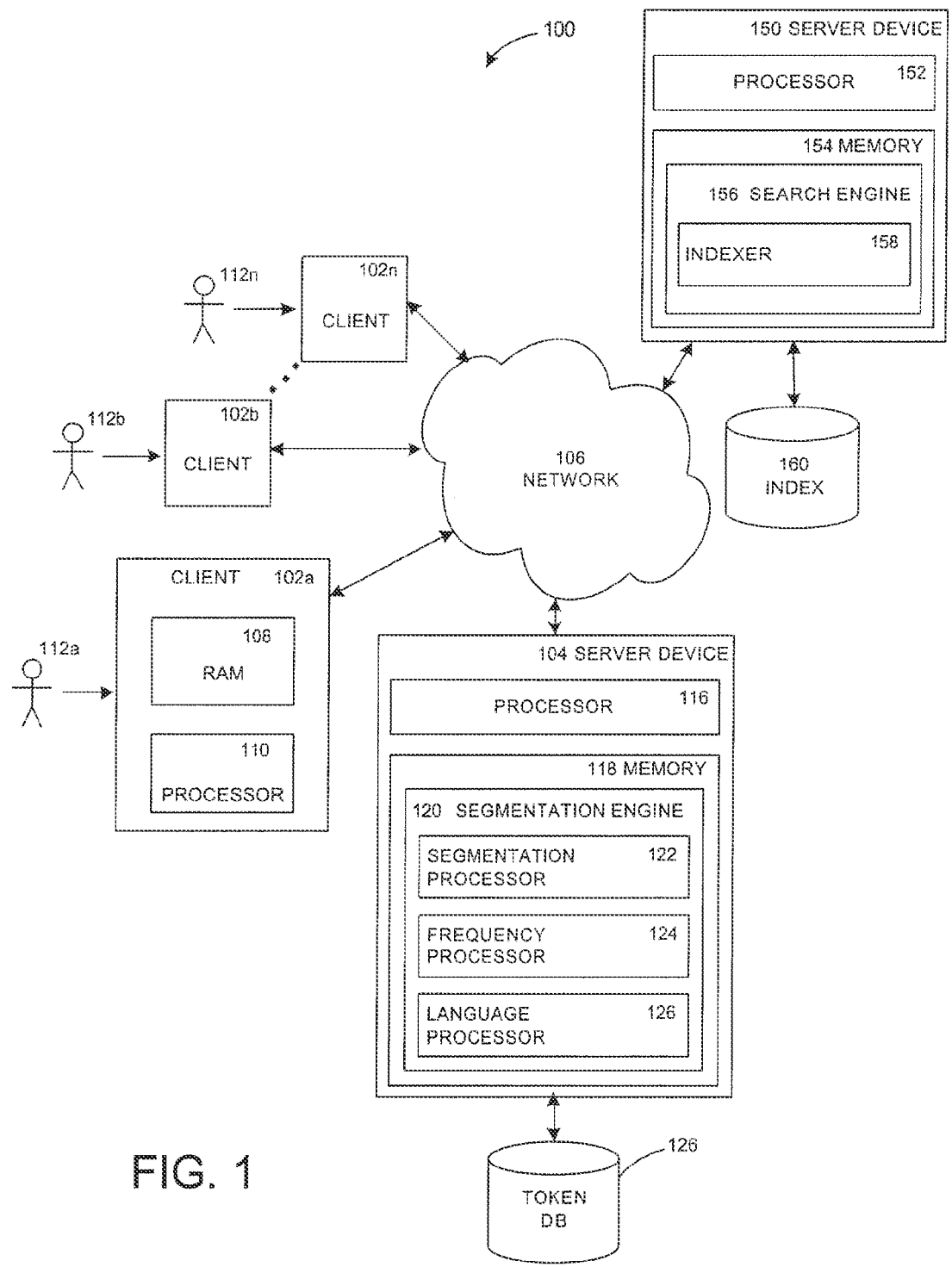
FIG. 1 illustrates a diagram of a system in accordance with one embodiment of the present invention.

Various systems in accordance with the present invention may be constructed. FIG. 1 is a diagram illustrating an exemplary system in which exemplary embodiments of the present invention may operate. The present invention may operate, and be embodied in, other systems as well.

Referring now to the drawings in which like numerals indicate like elements throughout the several figures, FIG. 1 is a diagram illustrating an exemplary environment for implementation of an embodiment of the present invention. The system 100 shown in FIG. 1 comprises multiple client devices 102a-n in communication with a server device 104 and a server device 150 over a network 106. In one embodiment, the network 106 shown comprises the Internet. In other embodiments, other networks, such as an intranet, WAN, or LAN may be used. Moreover, methods according to the present invention may operate within a single computer.

The client devices 102a-n shown in FIG. 1 each comprise a computer-readable medium, such as a random access memory (RAM) 108 coupled to a processor 110. The processor 110 executes computer-executable program instructions stored in memory 108. Such processors may comprise a microprocessor, an ASIC, and state machines. Such processors comprise, or may be in communication with, media, for example computer-readable media, which stores instructions that, when executed by the processor, cause the processor to perform the steps described herein. Embodiments of computer-readable media include, but are not limited to, an electronic, optical, magnetic, or other storage or transmission device capable of providing a processor, such as the processor 110 of client 102a, with computer-readable instructions. Other examples of suitable media include, but are not limited to, a floppy disk, CD-ROM, DVD, magnetic disk, memory chip, ROM, RAM, an ASIC, a configured processor, all optical media, all magnetic tape or other magnetic media, or any other suitable medium from which a computer processor can read instructions. Also, various other forms of computer-readable media may transmit or carry instructions to a computer, including a router, private or public network, or other transmission device or channel, both wired and wireless. The instructions may comprise code from any suitable computer-programming language, including, for example, C, C++, C#, Visual Basic, Java, Python, Perl, and JavaScript.

Client devices 102a-n may also comprise a number of external or internal devices such as a mouse, a CD-ROM, DVD, a keyboard, a display, or other input or output devices. Examples of client devices 102a-n are personal computers, digital assistants, personal digital assistants, cellular phones, mobile phones, smart phones, pagers, digital tablets, laptop computers, Internet appliances, and other processor-based devices. In general, a client device 102a may be any suitable type of processor-based platform that is connected to a network 106 and that interacts with one or more application programs. Client devices 102a-n may operate on any operating system capable of supporting a browser or browser-enabled application, such as Microsoft® Windows® or Linux. The client devices 102a-n shown include, for example, personal computers executing a browser application program such as Microsoft Corporation's Internet Explorer™, Netscape Communication Corporation's Netscape Navigator™, and Apple Computer, Inc.'s Safari™.

Through the client devices 102a-n, users 112a-n can communicate over the network 106 with each other and with other systems and devices coupled to the network 106. As shown in FIG. 1, a server device 104 and a server device 150 are also coupled to the network 106.

The server device 104 can comprise a server executing a segmentation engine application program and server device 150 can comprise a server executing a search engine application program. Similar to the client devices 102a-n, the server device 104 and server device 150 shown in FIG. 1 comprise a processor 116 coupled to a computer-readable memory 118 and a processor 152 coupled to a computer-readable memory 154, respectively. Server devices 104 and 150, depicted as single computer systems, may be implemented as a network of computer processors. Examples of server devices 104, 150 are servers, mainframe computers, networked computers, a processor-based device, and similar types of systems and devices. Client processor 110 and the server processors 116, 152 can be any of a number of computer processors, as described above, such as processors from Intel Corporation of Santa Clara, Calif. and Motorola Corporation of Schaumburg, Ill.

Memory 118 contains a segmentation application program, also known as a segmentation engine 120. The server device 104, or related device, can access the network 106 to receive strings of characters from other devices or systems connected to the network 106. Characters can include, for example, marks or symbols used in a writing system, including data representing a character, such as ASCII, Unicode, ISO 8859-1, Shift-JIS, and EBCDIC or any other suitable character set. In one embodiment, the segmentation engine 120 can receive a string of characters, such as a domain name, from a server device on the network 106 when a user 112a attempts to direct a web browser application to a domain name that is not active.

In one embodiment, the segmentation engine 120 identifies candidate languages for the string of characters, segments the string of characters into potential combinations of tokens for each candidate language, and selects a particular language and combination to associate with the string of characters. A token can comprise a word, a proper name, a geographic name, an abbreviation, an acronym, a stock market ticker symbol, or other tokens. The segmentation engine 120 can include a segmentation processor 122, a frequency processor 124, and a language processor 126. In the embodiment shown in FIG. 1, each comprises computer code residing in the memory 118.

The language processor 126 can identify a candidate language or languages for the string of characters. In one embodiment, the language processor 126 can use signals to identify a number of candidate languages for the string of characters. For example, the language processor can use linguistics, the IP address of the user, a character set used for the string of characters, browser settings of a browser application program associated with the user, and a top-level domain associated with the string of characters to determine the candidate languages for the string of characters.

The segmentation processor 122 can determine a list of potential combinations of tokens or segmented results from the string of characters for each candidate language. In one embodiment, the token processor 124 determines a probability for each segmented result in the list and selects the top segmented results for each language based on the probability. The probability for a segmented result can be based on frequency values associated with the individual tokens in the result. In one embodiment, the unsegmented string of characters may be included as a segmented result.

The frequency processor 124 can perform a frequency search or cause one to be performed on the top-selected segmented results of each candidate language. The frequency processor 124 can include a spell-checking functionality or can call a spell-checking functionality residing elsewhere to perform a spell check on the selected segmented results. Any spell corrected results can be included in the frequency search. In one embodiment, the frequency processor sends the selected segmented results to the server device 150 to perform a frequency search on the selected segmented results. A frequency search can determine the frequency of occurrence for each particular segmented result as described below. Based on the frequency search a best or operable segmented result can be identified by the segmentation processor 122. The language associated with the operable result can be identified by the segmentation processor 122 as the operable language for the string of characters. In one embodiment, the operable segmented result and the operable language can be sent to an advertising server that can select advertisements targeted based on one or both of the operable language and the segmented result. Other functions and characteristics of the segmentation processor 122, the frequency processor 124, and the language processor 126 are further described below.

Server device 104 also provides access to other storage elements, such as a token storage element, in the example shown a token database 120. The token database 120 can be used to store tokens and frequency information associated with each token. The token database 120 can also store the language or languages associated with each token. Data storage elements may include any one or combination of methods for storing data, including without limitation, arrays, hash tables, lists, and pairs. The server device 104 can access other similar types of data storage devices.

The server device 150 can include a server executing a search engine application program, such as the Google™ search engine. In other embodiments, the server device 150 can comprise a related information server or an advertising server. In another embodiment, there can be multiple server devices 150.

Memory 154 contains the search engine application program, also known as a search engine 156. The search engine 156 can locate relevant information from the network 106 in response to a search query from a user 112a and can maintain a search log of search queries. The search engine 156 can also perform a frequency search in response to a frequency search request from the frequency processor 124. The search engine 156 can provide a search result set to a user 112a or frequency information to the segmentation engine 120 via the network 106.

in one embodiment, the server device 150, or related device, has previously performed a crawl of the network 106 to locate articles, such as web pages, stored at other devices or systems coupled to the network 106. Articles include, for example, documents, emails, instant messenger messages, database entries, web pages of various formats, such as HTML, XML, XHTML, Portable Document Format (PDF) files, and media files, such as image files, audio files, and video files, or any other documents or groups of documents or information of any suitable type whatsoever. An indexer 158 can be used to index the articles in memory 154 or on another data storage device, such as an index 160. The index may also include the language or languages associated with each article. In one embodiment, there are multiple indexes each containing a portion of the total articles indexed. It should be appreciated that other suitable methods for indexing articles in lieu of or in combination with crawling may be used, such as manual submission.

The search engine 156 can perform a frequency search in a number of suitable ways. In one embodiment, the search engine 156 can perform a web search using each top selected segmented result as a search query and can search for articles containing the search query in the candidate language of the segmented result. In this embodiment, a frequency search result set can be generated and can comprise one or more article identifiers. An article identifier may be, for example, a Uniform Resource Locator (URL), a file name, a link, an icon, a path for a local file, or anything else that identifies an article. In one embodiment, an article identifier can comprise a URL associated with an article. The frequency processor 124 can use the number of article identifiers in each frequency search result set as a representation of the number of occurrences of the respective segmented result.

In another embodiment, the frequency processor 124 can interface directly with the indexer 158. The indexer 158 can determine, for each top selected segmented result, the number of articles in the associated candidate language in which the segmented result appears. This information can be sent to the frequency processor 124. In still another embodiment, the search engine 156 and/or the frequency processor 124 can determine, for each selected segmented result, the number of occurrences in search queries in the associated candidate language from the search log and the frequency processor 124 can determine a frequency of occurrence based on this search log information. In one embodiment, the number of articles or search queries in a frequency search associated with a segmented result may be normalized based on the total number of articles or search queries in the associated language.

It should be noted that the present invention may comprise systems having different architecture than that which is shown in FIG. 1. For example, in some systems according to the present invention, server device 104 may comprise a single physical or logical server. The system 100 shown in FIG. 1 is merely exemplary, and is used to help explain method illustrated in FIG. 2.

Process

Various methods in accordance with embodiments of the present invention may be carried out. One exemplary method according to the present invention comprises identifying at least a first candidate language and a second candidate language associated with a string of characters, determining at least a first segmented result associated with the first candidate language from the string of characters and a second segmented result associated with the second candidate language from the string of characters, determining a first frequency of occurrence for the first segmented result and a second frequency of occurrence for the second segmented result, and identifying an operable language from the first candidate language and the second candidate language based at least in part on the first frequency of occurrence and the second frequency of occurrence. More than two candidate languages can be identified and more than two segmented results can be determined. For example, three candidate languages can be identified and four segmented results can be determined for each candidate language.

The operable language can be identified based in part on identifying an operable segmented result from the first segmented result and the second segmented result based at least in part on the first frequency of occurrence and the second frequency of occurrence. A first candidate language and a second candidate language may be identified based in part on one or more language signals. The language signals can comprise at least one of linguistics associated with the string of characters, an IP address of a user associated with the string of characters, a character set used for the string of characters, browser settings of a browser application program associated with a user, and a top-level domain associated with the string of characters. In one embodiment, identifying the operable language may be based at least in part on language signals.

In one embodiment, identifying the operable language from the first candidate language and the second candidate language based at least in part on the first frequency of occurrence and the second frequency of occurrence can comprise selecting the first candidate language if the first frequency of occurrence is greater than the second frequency of occurrence. The string of characters can comprise a domain name. The first segmented result can comprise a first combination of tokens and the second segmented result comprises a second combination of tokens.

In one embodiment, determining the first frequency of occurrence for the first segmented result can comprise determining a number of articles in the first candidate language containing the first segmented result and normalizing the number of articles based on a total number of articles in the first candidate language and determining the number of articles in the first language containing the first segmented result can comprise determining a number of article identifiers in a search result set generated in response to a search query comprising the first segmented result.

In one embodiment, determining the number of articles in the first language containing the first segmented result can comprise accessing an index of articles. In another embodiment, determining the first frequency of occurrence can comprise determining a number of occurrences of the first segmented result in a plurality of search queries in the first candidate language and normalizing the number of occurrences based on a total number of search queries in the first candidate language.

The method may also comprise selecting an article based at least in part on the operable language or the operable segmented result (or both) and the article can comprise an advertisement. In one embodiment, determining the first segmented result can comprise determining a plurality of segmented results in the first candidate language from the string of characters, and identifying the first segmented result from the plurality of segmented results in the first candidate language. Identifying the first segmented result can comprise calculating a probability value for each of the plurality of segmented results. A first probability value associated with the first segmented result can be based at least in part on a frequency of each token within the first segmented result.

Another exemplary method comprises determining a first segmented result in a first candidate language and a second segmented result in a second candidate language from a domain name, determining a first frequency of occurrence for the first segmented result in at least one of an article index, a text index, and a search result set, determining a second frequency of occurrence for the second segmented result, if the first frequency of occurrence is greater than the second frequency of occurrence, then selecting the first candidate language as an operable language, if the second frequency of occurrence is greater than the first frequency of occurrence, then selecting the second candidate language as the operable language, selecting an advertisement based at least in part on the operable language, wherein the advertisement includes text in the operable language, and causing a display of the advertisement in association with a web page associated with the domain name.

Figure 2:
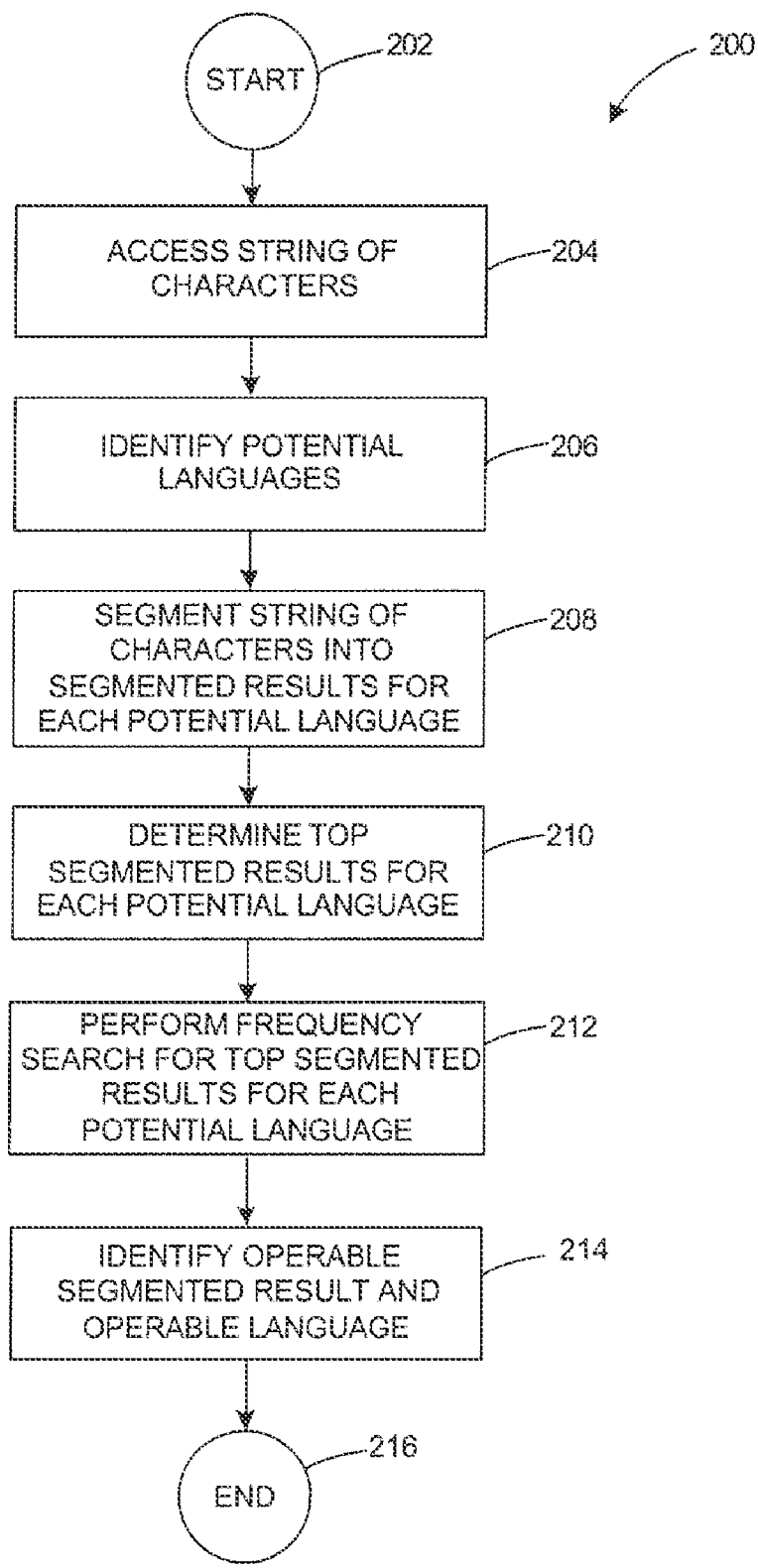
FIG. 2 illustrates a flow diagram of one embodiment of a method carried out by the present invention.

FIG. 2 illustrates an exemplary method 200 for selecting a language for text segmentation, in accordance with one embodiment of the invention. This exemplary method is provided by way of example, as there are a variety of ways to carry out methods according to the present invention. The method 200 shown in FIG. 2 can be executed or otherwise performed by one or a combination of various systems. The method 200 is described below as carried out by the system 100 shown in FIG. 1 by way of example, and various elements of the system 100 are referenced in explaining the example method of FIG. 2.

Referring to FIG. 2, in block 202, the example method begins. Block 202 is followed by block 204, in which a string of characters can be accessed by the segmentation engine 120. A string of characters can be received or accessed from a device connected to network 106, for example, or from another device. In one embodiment, the string of characters can be a domain name associated with an inactive or non-existent website received from an advertising server associated with the domain name.

Block 204 is followed by block 206, in which candidate languages for the string of characters are identified. In one embodiment, the language processor 126 can use one or more language signals to determine a number of candidate languages for the string of characters. For example, the language processor can identify, based on language signals, English, French and Spanish as the three candidate languages for the string of characters.

Some of the language signals used can be, for example, linguistics associated with the string of characters, the IP address of a user associated with the string of characters, the character set used for the string of characters, browser settings of a browser application program associated with the user associated with the string of characters, and a top-level domain associated with the string of characters. Linguistics can be used, for example, to determine if the structure or nature of the string of characters indicates that it is in a particular language. For example, certain languages have a tendency to start or end with a certain group of characters and use general patterns. The IP address of the user can indicate the location and country of the user. From the country information a language or languages associated with the country can be used as candidate languages. The character set of the string of characters can indicate a language or languages associated with the string of characters. For example, a Cyrillic character set can indicate Russian or some other Slavic language. The browser settings for a browser application program of a user associated with the character string can indicate a language and/or a character set associated with the character string. For example, the language and character set settings of the user's browser application program can be passed in an HTTP header along with the string of characters. A top-level domain associated with the string of characters can indicate a country. A top-level domain can be the highest level of hierarchy after the root. In a domain name, the top-level domain is the portion of the domain name that appears farthest to the right. For example, for the domain name "usedrugs.co.uk", the top-level domain is ".uk" and can indicate the United Kingdom. The top-level domain ".ru" can indicate Russia. The country associated with the top-level domain can be used in determining a candidate language, such as "ru" indicates Russia, which indicates that the associated string of characters may be in the Russian language. Some top-level domains may indicate more than one language. For example, ".ch" can indicate Switzerland and can indicate that the string of characters can be associated with French, German, or Italian. Other suitable signals and methods of identifying candidate languages for the string of characters may be used.

Block 206 is followed by block 208, in which a plurality of segmented results is generated from the string of characters by segmenting the string of characters for each of the candidate languages. Segmenting the string of characters may include parsing the characters in the string into a plurality of combinations of tokens and can be performed by the segmentation processor 122. The segmentation processor 122 can develop a list of segmented results for each candidate language. Each segmented result can be a particular combination of tokens or a single token. For example, the string of characters "assocomunicazioni" can be segmented in Italian into "asso comunicazioni" and other segmented results and can be segmented in French into "asso com uni cazioni" and other segmented results. In another example, the string of characters "maisonblanche" can be segmented in French into "maison blanche" and other segmented results and can be segmented in English into "mai son blanc he" and other segmented results. In another example, the string of characters "usedrugs" can be segmented in English into the segmented results including "used rugs", "use drugs", "us ed rugs", "u sed rugs", "usedrugs", etc, Segmented results can also be generated for the other candidate languages, such as, in the example above, French and Spanish. The unsegmented string of characters may be included as a segmented result.

The segmentation processor 122 can utilize tokens from the token database 126 in the segmentation process. Various methods can be used to segment the string of characters, such as the segmentation techniques described in PCT International Patent Application No. PCT/US03/41609 entitled "Methods and Systems for Text Segmentation" filed Dec. 30, 2003, which is hereby incorporated in its entirety by this reference.

Block 208 is followed by block 210, in which the top segmented results are determined for each candidate language. The top segmented results can be determined by the segmentation processor 122 and can be the results with the highest probability of being the best or operable segmented result. In one embodiment, the segmented results can be ranked based on a probability value determined for each segmented result. In one embodiment, a probability value can be determined by summing frequency values associated with the individual tokens within each individual segmented result. In another embodiment, a probability value can be determined by a complex function involving summing the logarithms of the frequency values associated with the individual tokens within each individual segmented result. A number of the top ranking segmented results can then be selected. For example, the segmented results for each candidate language can be ranked and the top three results of each candidate language can be selected.

Block 210 is followed by block 212, in which a frequency search is performed for the top, selected segmented results for each candidate language. The frequency search can be performed by the frequency processor 124 in conjunction with the search engine 156. In one embodiment, the segmentation processor 122 can pass the selected segmented results to the frequency processor 124, which can determine the frequency of occurrence for each of the segmented results in a corpus of articles or search queries.

In one embodiment, the frequency processor 124 can determine the frequency of occurrence for the segmented results based on articles indexed by a search engine 156. In one embodiment, the frequency processor 124 can send the top selected segmented results to the search engine 156 via the network 106. The search engine 156 can perform a search for each of the segmented results in the indexed articles by using each segmented result as a search query. For example, the frequency processor 124 can send each segmented result for each candidate language surrounded by quotation marks to the search engine 156 as a search query, so that the search engine 156 performs the search on the exact segmented phrase in articles in the particular language. In one embodiment, for each segmented result, the search engine 156 can generate a search result set containing a number of article identifiers responsive to the search query. The search engine 156 can send the search result set for each of the segmented results back to the frequency processor 124 via the network 106. The frequency processor 124 can determine from each search result set, based on the number of article identifiers, the frequency with which each segmented result occurs.

In another embodiment, the frequency processor 124 can send the top, selected segmented results to the indexer 158 via the network 106. The indexer 158 can access the index 160 to determine the number of articles in the particular language in which a segmented result occurs and can do this for each of the selected segmented results. In one embodiment, the index 160 may be multiple indexes and the indexer 158 can check a fraction of the total index for each segmented result. The indexer 158 can then pass the number of occurrences associated with each segmented result to the frequency processor 124 via the network 106.

In still another embodiment, the frequency processor 124 can send the top, selected segmented results to the search engine 156 via the network 106 to determine the number of occurrences of the segmented results in search queries. For example, the search engine 156 can, for each segmented result in the associated language, determine the number of times that the segmented result was used as a search query or part of a search query. The number of occurrences in search queries for each segmented result can be sent by the search engine 156 to the frequency processor 124 via the network 106.

For example, if the segmentation processor 122 determines that the selected segmented results for the string of characters "usedrugs" in English are "used rugs", "use drugs", and "us ed rugs", the frequency processor 124 can send these segmented results and the segmented results associated with other candidate languages to the search engine 156. The search engine 156 can, for example, use these results as search queries and generate search result sets for each segmented result. For example, the search engine 156 can use "used rugs" as a search query and determine a search result set for the search query containing article identifiers associated with articles in English containing the phrase "used rugs". The search engine 156 can do the same for the segmented results associated with other candidate languages. In another embodiment, the search engine 156 can determine, from associated search logs containing prior received search queries, the number of times search queries containing the segmented results was received. For example, the search engine 156 can search its search logs for the number of times a search query containing the phrase "used rugs" was received. In still another embodiment, the indexer 158 of the search engine 156 can receive the search results and determine the number of articles in the index 160 or a portion of the index 160 containing the segmented results. For example, the indexer 158 can search through the index 160 or a portion of the index 160 for the number of English language articles containing "used rugs".

A spell-checking function can also be included in the frequency search. For example, the frequency processor 124 can include or can call a spell-checking function, so that the top, selected segmented results can be spell checked. The spell-checking function can determine correct or preferred spellings for the individual tokens in each segmented result. The frequency processor 124 can perform a frequency search on the top segmented results as well as any spelling-corrected segmented results to determine a frequency of occurrence for both results. For example, if a segmented result is "basebal game" and the spelling-corrected result is "baseball game", a frequency search can be performed for both of these results.

In one embodiment, each frequency of occurrence for the segmented results is a normalized value based on the number of total articles or search queries in the particular language. For example, if a segmented result in English language occurs in 70 English language articles or search queries and there are a total number of 1000 English articles or search queries, the frequency of occurrence for this English segmented result is 0.07 (70/1000). Similarly, if a segmented result in French occurs in 60 French language articles or search queries and there are a total number of 400 French language articles or search queries, the frequency of occurrence for this French segmented result is 0.15 (60/400). This way the frequency of occurrence takes into consideration the prevalence of the particular language in the corpus of articles or search results and is not inherently weighted to more prevalent languages.

Block 212 is followed by block 214, in which the operable language and operable segmented result are identified. In one embodiment, the frequency processor 124 can identify the operable language and operable segmented result. For example, the frequency processor 124 can select the segmented result that has the highest associated frequency of occurrence. As explained above, the frequency of occurrence can be a normalized value based on the number of articles or search queries containing the segmented result and the total number of articles or search queries in the particular language. Additional signals can also be used to determine the operable segmented result. For example, the frequency processor 124 can take into account an objective ranking (such as the PageRank™ ranking algorithm for web articles) of the articles containing each segmented result and use the objective ranking to weigh the articles containing each segmented result. The number of times the segmented result occurs in an article and the location of the segmented result in the articles can also be used to weigh the articles containing a segmented result. The candidate language associated with the operable segmented result can be selected as the operable language.

In one embodiment, the language signals used to identify the candidate languages in block 206 may be used in the determination of the operable language. If the language signals indicate that the string of characters is most likely a particular language, these signals can be used to more heavily weight this language. For example, the language signals, such as linguistics, the IP address of an associated user, the character set used for the string of characters, browser settings of browser application program associated with a user, and top-level domain associated with the string of characters, may indicate that the language associated with the string of characters is a particular language, such as French, for example. The frequency of occurrence information for a segmented result in another language, such as English, for example, may be close to or exceed the frequency of occurrence information for another segmented result in French. The language signals can be used to weight the French language in order to cause the selection of French as the operative language in this example. In 216, the method 200 ends.

The operable language and operable segmented result can be used in a variety of ways. The operable language and/or operable segmented result can be used in the selection of advertisements. For example, a user 112*a* may attempt to navigate his browser application to the website "usedrugs.com" by entering this string of characters into the browser application. If no such website exists at the domain name "usedrugs.com", the user's browser application may be redirected to a third-party website. The third-party website may desire to place advertisements and/or links relevant to the domain name entered by the user on a web page being viewed by the user. The third-party website can send the domain name "usedrugs.com" to the segmentation engine 120. The segmentation engine 120 can use the methods and systems described above to return an operable language and an operable segmented result to the third party website or an advertising server associated with the website. For example, the operable segmented result can be "used rugs" and the operable language can be English. The third-party website or advertising server can cause the display of advertisements and/or links relevant to the phrase "used rugs" in English on the web page being viewed by the user and can ensure that the language used on the website is English. The operable language can also be used in the selection of the language used in status messages displayed to the user.

General

While the above description contains many specifics, these specifics should not be construed as limitations on the scope of the invention, but merely as exemplifications of the disclosed embodiments. Those skilled in the art will envision any other possible variations that are within the scope of the invention. The terms first and second are used herein merely to differentiate one item from another item. The terms first and second are not used to indicate first or second in time, first or second in a list, or other order, unless explicitly noted. For example, the "second" may come in time or in a list before the "first", unless it is otherwise explicitly indicated.

That which is claimed:

1. A computer-implemented method comprising:
   accessing, by a computer system, a string of characters that are associated with a computing device;
   identifying, by the computer system, a plurality of candidate languages for segmenting the string of characters, wherein the plurality of candidate languages are identified based on one or more language indicators associated with the string of characters or the computing device;
   determining weights for the plurality of candidate languages based on the one or more language indicators, wherein each of the weights indicates a probability that a corresponding candidate language from the plurality of candidate languages is an appropriate language to use for interpreting the string of characters based on the string of characters or the computing device;
   determining one or more segmented results from the string of characters for each of the plurality of candidate languages, wherein a segmented result comprises a plurality of tokens that are created by inserting one or more breaks into the string of characters;
   identifying, from the plurality of candidate languages, an operable language for the string of characters based, at least in part, on a comparison of weighted frequencies associated with the candidate languages, wherein each of the weighted frequencies comprises a frequency with which the segmented results occur in a corpus associated with a corresponding candidate language, the frequency being weighted according to a corresponding weight from the determined weights that is associated with the corresponding candidate language; and
   providing information that identifies the operable language.

2. The method of claim 1, wherein the string of characters is received as part of a request from the computing device, and wherein the information is provided for further processing of the string of characters in association with the received request.

3. The method of claim 1, wherein the language indicators include one or more of: linguistics associated with the string of characters, an IP address associated with the computing device, a character set associated with the string of characters, a browser setting of a browser application program associated with the computing device, and a top-level domain associated with the string of characters.

4. The method of claim 1, wherein determining the segmented results comprises identifying, for each of the plurality of candidate languages, an operable segmented result from a plurality of segmented results for the candidate language based on probabilities associated with the plurality of segmented results;
   wherein a probability for a segmented result comprises a combination of frequencies with which each token in the segmented result occurs individually within a corpus associated with a candidate language corresponding to the segmented result; and
   wherein the frequencies with which the segmented results occur in corresponding corpora are determined using only the operable segmented result for each of the plurality of candidate languages.

5. The method of claim 1, wherein the operable language has a segmented result with a greatest frequency among the frequencies for the segmented results.

6. The method of claim 1, wherein a corpus associated with a candidate language includes one or more of articles in the candidate language or search queries in the candidate language.

7. A system comprising:
   a computer system;
   a segmentation engine of the computer system to access a string of characters that are associated with a computing device, to identify a plurality of candidate languages for segmenting the string of characters based on one or more language indicators associated with the string of characters or the computing device, and to determine weights for the plurality of candidate languages based on the one or more language indicators, wherein each of the weights indicates a probability that a corresponding candidate language from the plurality of candidate languages is an appropriate language to use for interpreting the string of characters based on the string of characters or the computing device;
   a segmentation processor of the computer system to determine one or more segmented results from the string of characters for each of the plurality of candidate languages, wherein a segmented result comprises a plurality of tokens that are created by inserting one or more breaks into the string of characters; and
   a language processor of the computer system to identify, from the plurality of candidate languages, an operable language for the string of characters based, at least in part, on a comparison of weighted frequencies associated with the candidate languages, wherein each of the weighted frequencies comprises a frequency with which the segmented results occur in a corpus associated with a corresponding candidate language, the frequency being weighted according to a corresponding weight from the determined weights that is associated with the corresponding candidate language.

8. The system of claim 7, wherein the string of characters is received as part of a request from the computing device, and wherein the information is provided for further processing of the string of characters in association with the received request.

9. The system of claim 7, wherein the language indicators include one or more of: linguistics associated with the string of characters, an IP address associated with the computing device, a character set associated with the string of characters, a browser setting of a browser application program associated with the computing device, and a top-level domain associated with the string of characters.

10. The system of claim 7, wherein the segmentation processor is further configured to determine the segmented results by identifying, for each of the plurality of candidate languages, an operable segmented result from a plurality of segmented results for the candidate language based on probabilities associated with the plurality of segmented results;
   wherein a probability for a segmented result comprises a combination of frequencies with which each token in the segmented result occurs individually within a corpus associated with a candidate language corresponding to the segmented result; and
   wherein the frequencies with which the segmented results occur in corresponding corpora are determined using only the operable segmented result for each of the plurality of candidate languages.

11. The system of claim 7, wherein the operable language has a segmented result with a greatest frequency among the frequencies for the segmented results.

12. The system of claim 7, wherein a corpus associated with a candidate language includes one or more of articles in the candidate language or search queries in the candidate language.

13. A computer program product comprising a computer-readable storage device including instructions that, when executed, cause a computer system to perform operations comprising:
   accessing a string of characters that are associated with a computing device;
   identifying a plurality of candidate languages for segmenting the string of characters, wherein the plurality of candidate languages are identified based on one or more language indicators associated with the string of characters or the computing device;
   determining weights for the plurality of candidate languages based on the one or more language indicators, wherein each of the weights indicates a probability that a corresponding candidate language from the plurality of candidate languages is an appropriate language to use for interpreting the string of characters based on the string of characters or the computing device;
   determining one or more segmented results from the string of characters for each of the plurality of candidate languages, wherein a segmented result comprises a plurality of tokens that are created by inserting one or more breaks into the string of characters;
   identifying, from the plurality of candidate languages, an operable language for the string of characters based, at least in part, on a comparison of weighted frequencies associated with the candidate languages, wherein each of the weighted frequencies comprises a frequency with which the segmented results occur in a corpus associated with a corresponding candidate language, the frequency being weighted according to a corresponding weight from the determined weights that is associated with the corresponding candidate language; and
   providing information that identifies the operable language.

14. The computer program product of claim 13, wherein the string of characters is received as part of a request from the computing device, and wherein the information is provided for further processing of the string of characters in association with the received request.

15. The computer program product of claim 13, wherein the language indicators include one or more of: linguistics associated with the string of characters, an IP address associated with the computing device, a character set associated with the string of characters, a browser setting of a browser application program associated with the computing device, and a top-level domain associated with the string of characters.

16. The computer program product of claim 13, wherein determining the segmented results comprises identifying, for each of the plurality of candidate languages, an operable segmented result from a plurality of segmented results for the candidate language based on probabilities associated with the plurality of segmented results;
    wherein a probability for a segmented result comprises a combination of frequencies with which each token in the segmented result occurs individually within a corpus associated with a candidate language corresponding to the segmented result; and
    wherein the frequencies with which the segmented results occur in corresponding corpora are determined using only the operable segmented result for each of the plurality of candidate languages.

17. The computer program product of claim 13, wherein the operable language has a segmented result with a greatest frequency among the frequencies for the segmented results.

18. The computer program product of claim 13, wherein a corpus associated with a candidate language includes one or more of articles in the candidate language or search queries in the candidate language.

\* \* \* \* \*